(12) United States Patent
Ogata et al.

(10) Patent No.: US 9,353,689 B2
(45) Date of Patent: May 31, 2016

(54) FUEL SUPPLY DEVICE OF GAS TURBINE ENGINE

(75) Inventors: Hideki Ogata, Kakogawa (JP);
Kazuhiko Ohyama, Akashi (JP);
Tomoyuki Hatano, Akashi (JP);
Akihiro Shimizu, Akashi (JP); Touya Miwa, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 836 days.

(21) Appl. No.: 13/637,324

(22) PCT Filed: Mar. 23, 2011

(86) PCT No.: PCT/JP2011/001702
§ 371 (c)(1),
(2), (4) Date: Nov. 21, 2012

(87) PCT Pub. No.: WO2011/118210
PCT Pub. Date: Sep. 29, 2011

(65) Prior Publication Data
US 2013/0055719 A1     Mar. 7, 2013

(30) Foreign Application Priority Data
Mar. 26, 2010 (JP) ................. 2010-072165

(51) Int. Cl.
| | |
|---|---|
| *F16K 11/14* | (2006.01) |
| *F02C 7/228* | (2006.01) |
| *F16K 11/044* | (2006.01) |
| *F16K 31/10* | (2006.01) |
| *F16K 31/528* | (2006.01) |
| *F23K 5/04* | (2006.01) |
| *F23K 5/06* | (2006.01) |
| *F23K 5/14* | (2006.01) |
| *F23R 3/34* | (2006.01) |

(52) U.S. Cl.
CPC ............... *F02C 7/228* (2013.01); *F16K 11/044* (2013.01); *F16K 31/10* (2013.01); *F16K 31/528* (2013.01); *F23K 5/04* (2013.01); *F23K 5/06* (2013.01); *F23K 5/147* (2013.01); *F23R 3/343* (2013.01); *Y02T 50/672* (2013.01)

(58) Field of Classification Search
CPC ....... F16K 11/14; F16K 11/16; F16K 11/161; F02C 7/228; F02C 7/232; F02C 9/293; F23D 2900/00015; F23R 3/286; F23R 3/343
USPC .................................. 60/734, 739, 740, 746
See application file for complete search history.

(56) References Cited

U.S. PATENT DOCUMENTS 7,823,388 B2 * 11/2010 Murakami ...................... 60/773
2008/0245074 A1 * 10/2008 Oda et al. ......................... 60/737

FOREIGN PATENT DOCUMENTS

| EP | 1816342 A1 * | 8/2007 |
|---|---|---|
| JP | 46-43572 B1 | 12/1971 |

(Continued)

*Primary Examiner* — Patrick Hamo
(74) *Attorney, Agent, or Firm* — Sughrue Mion, PLLC

(57) ABSTRACT

In a fuel supply device of a gas turbine engine of the present invention, a fuel divider 66 includes a fuel entrance E1 into which the fuel supplied from a collecting fuel passage 63 is introduced; a pilot port 76 connected to the pilot fuel passage 64; a main port 77 connected to the main fuel passage 65; a pilot port needle valve element 101 which adjusts an opening degree of the pilot port 76; a main port needle valve element 102 which opens and closes the main port 77; and a drive element 100 which is actuated according to the fuel pressure at the fuel inlet E1 to drive the pilot port needle valve element 101 and the main port needle valve element 102.

12 Claims, 12 Drawing Sheets

(56) References Cited

FOREIGN PATENT DOCUMENTS

| JP | 59-19934 | 2/1984 |
| JP | 2-163422 A | 6/1990 |
| JP | 5-52124 A | 3/1993 |
| JP | 4220558 B2 | 2/2009 |

* cited by examiner

FUEL SUPPLY DEVICE OF GAS TURBINE ENGINE

TECHNICAL FIELD

The present invention relates to a fuel supply device of a gas turbine engine for supplying a fuel to a combustor including pilot burners and main burners.

BACKGROUND ART

For environment protection purposes, in gas turbine engines, strict environmental standards are set in a composition of combustion exhaust gas emitted. It is required to reduce harmful substances such as nitrogen oxide (hereinafter expressed as $NO_x$) from the exhaust gas. In large-sized gas turbines and engines for aircraft, a pressure ratio tends to be set high, because of requirement of low fuel consumption and a high power output. Correspondingly, air at an inlet of a fuel supply device tends to be placed in higher temperature and higher pressure conditions. With an increase in the temperature of the air at the inlet of the fuel supply device, a combustion temperature rises, which may undesirably result in an increase in the amount of $NO_x$ in the exhaust gas.

Under the circumstances, in recent years, there has been proposed a combined combustion method in which two combustion methods, i.e., a lean pre-mixed combustion method which can reduce the amount of $No_x$ generation effectively, and a diffusion combustion method which has high ignition performance and high flame stabilizing performance are combined. In the lean pre-mixed combustion method, air and fuel are pre-mixed and an air-fuel mixture with a uniform fuel concentration is combusted. In this method, a combustion zone in which a flame temperature is locally high does not exist. In addition, the flame temperature can be lowered as a whole because of lean fuel. Therefore, the lean pre-mixed combustion method has an advantage that the amount of $NO_x$ generation can be reduced effectively. However, in the lean pre-mixed combustion method, since a great amount of air and fuel are mixed uniformly, a local combustion concentration in a combustion zone is very low, which degrades combustion stability particularly under a low load state. By comparison, in the diffusion combustion method, the fuel and the air are combusted while diffusing and mixing them. This method has advantages that a flame is less likely to vanish even during the low load state, and the flame stabilizing performance is high. Therefore, in the combined combustion method which is a combination of the lean pre-mixed combustion method and the diffusion combustion method, combustion stability in a diffusion combustion zone can be maintained during starting or during the low load state, and the amount of $NO_x$ generation in a lean pre-mixed combustion zone can be reduced during a high load state.

A fuel supply device according to the combined combustion method includes pilot burners which inject fuel spray so as to form the diffusion combustion zone within a combustion chamber by the diffusion combustion method, and main burners which supply an air-fuel mixture containing pre-mixed fuel and air so as to form a pre-mixed combustion zone within the combustion chamber by the lean pre-mixed combustion method. In this fuel supply device, fuel is supplied only to the pilot burners during starting or during the low load state, while the fuel is also supplied to the main burners in addition to the pilot burners during the high load state. When the gas turbine engine transitions from the low load state to the high load state, the fuel supply device controls a ratio between the fuel supplied to the pilot burners and the fuel supplied to the main burners so that the ratio changes gradually from 1:0 to, for example, 1:9, while maintaining a proper value of the ratio for achievement of stable combustion and reduction of $NO_x$.

In a conventional method, to perform the above complicated control, flow control valves are respectively provided in a pilot fuel passage through which the fuel is supplied to the pilot burners and a main fuel passage through which the fuel is supplied to the main burners, and a controller controls these flow control valves (Patent Literature 1).

However, if the flow control valves are provided in these two fuel passages, respectively, a ratio of the weight and cost of the flow control valves and the controller with respect to weight and cost of an overall engine increases especially in a small-sized gas turbine for aircraft, and its influence is non-negligible, although the ratio is differed between a gas turbine for aircraft and a gas turbine for industry, or between a large-sized gas turbine and a small-sized gas turbine, which results in an influence which cannot be ignored. This precludes application of a combined combustion method which requires an additional fuel control system (flow control valves and controller) to the small-sized gas turbine for aircraft. Further, the addition of the fuel control system causes an increased weight and a complicated structure.

Under the circumstances, the applicant proposed a system in which a fuel divider is provided between a pilot fuel passage through which the fuel is supplied to the pilot burners and a main fuel passage through which the fuel is supplied to the main burners, and a collecting fuel passage through which the fuel is supplied to the pilot fuel passage and to the main fuel passage, and a controller controls the fuel divider and the fuel passages (Patent Literature 2).

CITATION LISTS

Patent Literature

Patent Literature 1: Japanese Laid-Open Patent Application Publication No. Hei. 5-52124
Patent Literature 2: Japanese Patent No. 4220558

SUMMARY OF THE INVENTION

Technical Problem

In the system using the above stated fuel divider, the fuel is divided to be fed to the pilot fuel passage and to the main fuel passage so that the fuel is fed to the pilot burners and to the main burners. It is necessary to ensure compatibility between the fact that the fuel is divided smoothly and accurately and the fact that the fuel divider ensures fuel sealing performance. However, it is difficult to ensure the sealing performance in the fuel divider.

An object of the present invention is to provide a fuel supply device of a gas turbine engine which can perform fuel flow control with a simple structure and inexpensively and ensure sufficient fuel sealing performance, in a combined combustion method in which two combustion methods which are a diffusion combustion method and a lean pre-mixed combustion method are combined.

Solution to Problem

To achieve the above object, there is provided a fuel supply device of a gas turbine engine, of the present invention, which supplies fuel to a combustor including a pilot burner and a main burner; the fuel supply device comprising: a pilot fuel passage through which the fuel is supplied to the pilot burner;

a main fuel passage through which the fuel is supplied to the main burner; a collecting fuel passage through which the fuel is supplied to the pilot fuel passage and to the main fuel passage; and a fuel divider which divides the fuel supplied from the collecting fuel passage to feed the fuel to the pilot fuel passage and to the main fuel passage; wherein the fuel divider includes: a fuel entrance into which the fuel supplied from the collecting fuel passage is introduced; a pilot port connected to the pilot fuel passage; a main port connected to the main fuel passage; a pilot port needle valve element which adjusts an opening degree of the pilot port; a main port needle valve element which opens and closes the main port; and a drive element which is actuated according to the fuel pressure at the fuel entrance to move the pilot port needle valve element and the main port needle valve element; wherein when the fuel pressure at the fuel entrance is not higher than a predetermined value, the fuel is supplied only to the pilot fuel passage; and when the fuel pressure at the fuel entrance is higher than the predetermined value, the fuel is supplied to the pilot fuel passage and to the main fuel passage.

In accordance with this configuration, by using the fuel divider, the amount of the fuel fed to the pilot fuel passage and the amount of the fuel fed to the main fuel passage are adjusted automatically according to the fuel pressure. This eliminates a need for flow control valves in the pilot fuel passage and in the main fuel passage, respectively. Therefore, a structure is simplified, and a complicated control circuit may be dispensed with, which results in manufacturing cost saving. In addition, since the main port is closed by actuating the drive element so as to move the main port needle valve element, it provides high sealing function, and is able to seal the fuel surely.

Advantageous Effects of the Invention

A fuel supply device of a gas turbine engine of the present invention has a simple and inexpensive structure, and can ensure sufficient fuel sealing performance.

DESCRIPTION OF EMBODIMENTS

Hereinafter, preferred embodiments of the present invention will be described with reference to the drawings.

Embodiment 1

First of all, Embodiment 1 of the present invention will be described with reference to FIGS. 1 to 7. Hereinafter, description will be given sequentially of the configuration of a combustor, the configuration of a fuel control system, the configuration of a fuel divider, the operation of the fuel divider, and the relation between a fuel pressure and a flow (flow rate) of the fuel.

<Configuration of Combustor>

Figure 1:
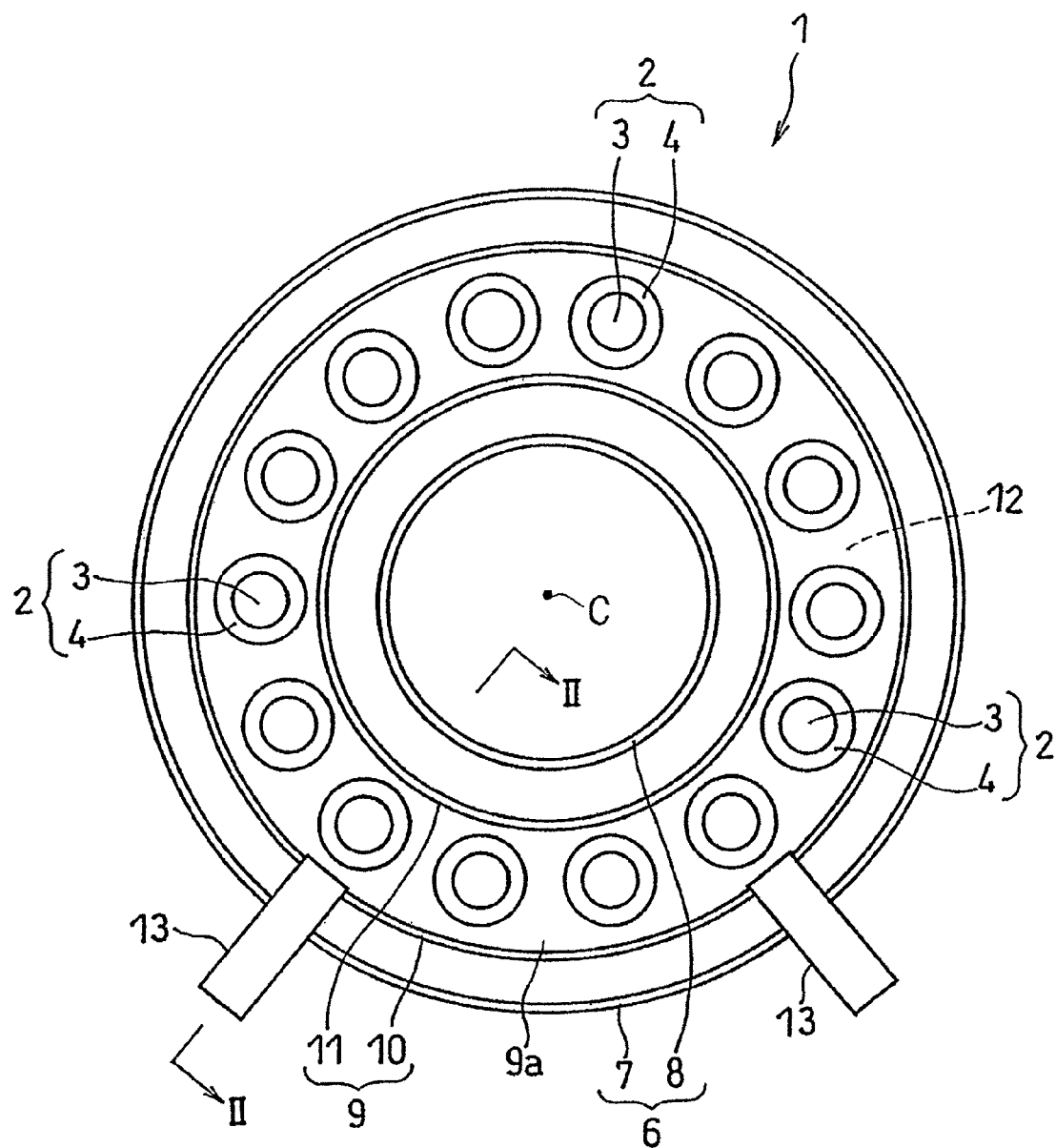
FIG. 1 is a schematic front view showing a fuel supply device of a gas turbine engine according to Embodiment 1 of the present invention.

FIG. 1 shows a head portion of a combustor 1 of a gas turbine engine including a fuel supply device according to Embodiment 1 of the present invention. The combustor 1 is configured to combust an air-fuel mixture generated by mixing fuel with compressed air supplied from a compressor (not shown) in the gas turbine engine, and feed high-temperature and high-pressure combustion gas generated by the combustion to a turbine to drive the turbine.

The combustor 1 is of an annular type and has a configuration in which a tubular inner casing 8 is disposed inward relative to a tubular outer casing 7 such that the center axis C of the gas turbine engine is a center of the inner casing 8. The outer casing 7 and the inner casing 8 constitute a combustor housing 6 having an annular inner space. In the annular inner space of the combustor housing 6, a tubular inner liner 11 is disposed inward relative to a tubular outer liner 10. These liners 11 and 10 constitute a combustion tube 9. The combustion tube 9 is disposed concentrically with the combustor housing 6. The combustion tube 9 has an annular combustion chamber 12 inside thereof. A plurality of (14 in the present embodiment) fuel injection units 2 for injecting fuel to an interior of the combustion chamber 12 are attached to a top wall 9a of the combustion tube 9. The fuel injection units 2 are arranged at equal intervals on a circle which is concentric with the combustion tube 9. Each of the fuel injection units 2 includes a pilot burner 3 and a main burner 4. The main burner 4 is provided to enclose the outer periphery of the pilot burner 3 such that the main burner 4 is concentric with the pilot burner 3. The pilot burner 3 is a burner for diffusion combustion, while the main burner 4 is a burner for lean pre-mixed combustion. A detail of these burners will be described later.

Two ignition plugs 13 for performing ignition extend in a radial direction of the combustion tube 9 to penetrate the outer casing 7 and the outer liner 10, and their tip ends face the fuel injection units 2, respectively. In the combustor 1, a combustible air-fuel mixture injected from each of the two fuel injection units 2 facing the two ignition plugs 13, respectively, is ignited, and then a flame generated by the combustion is transferred to a combustible air-fuel mixture injected from an adjacent fuel injection unit 2, and further to a combustible air-fuel mixture injected from an adjacent fuel injection unit 2. Finally, the flame spreads to the entire periphery.

Figure 2:
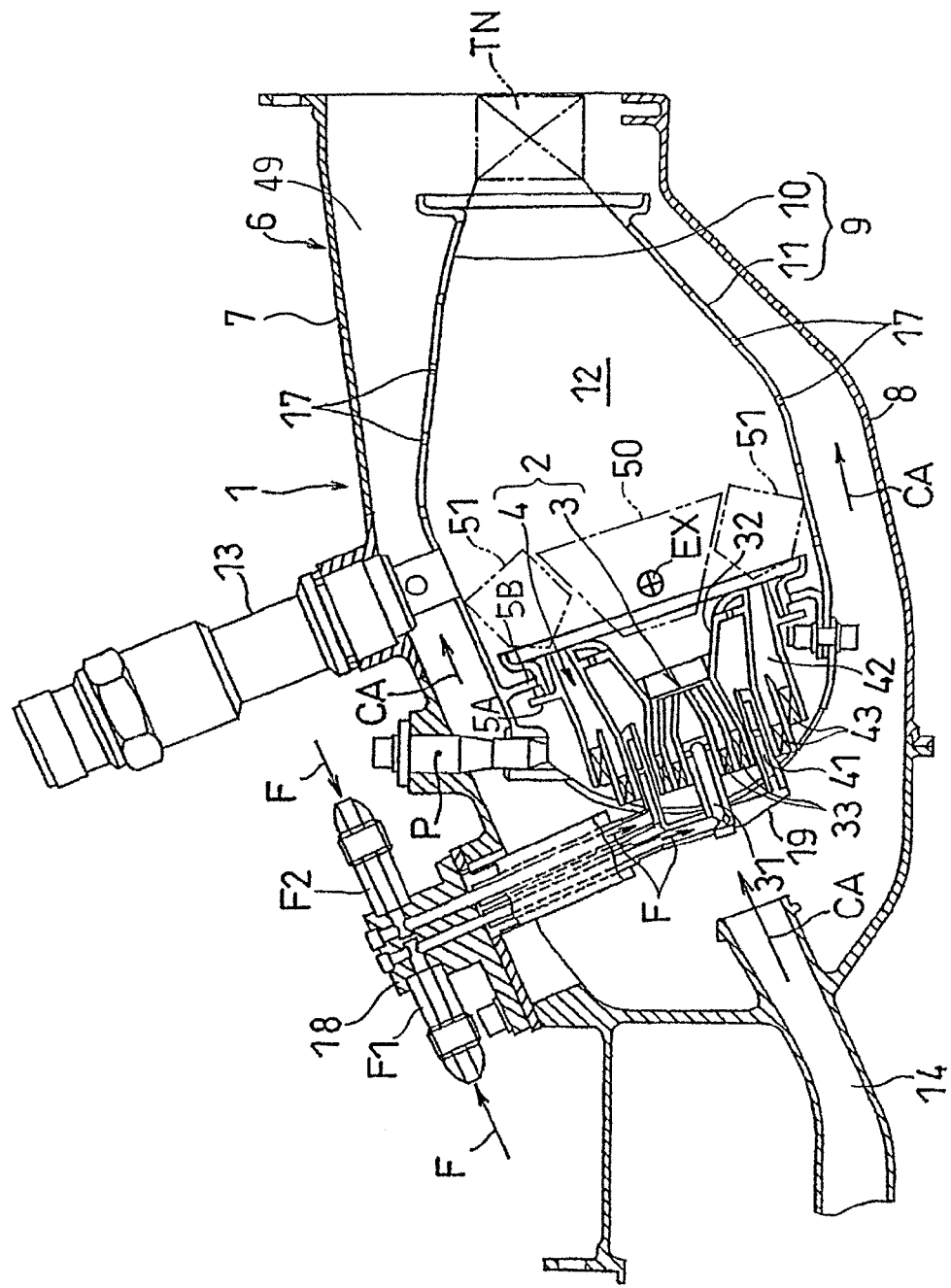
FIG. 2 is an enlarged longitudinal-sectional view taken along line II-II of FIG. 1.

FIG. 2 is an enlarged cross-sectional view taken along line II-II of FIG. 1. Compressed air CA supplied from the compressor is introduced into the annular inner space of the combustor housing 6 via an annular pre-diffuser passage 14. The introduced compressed air CA is supplied to the fuel injection units 2, and to the interior of the combustion chamber 12 through a plurality of air introduction ports 17 provided on each of the outer liner 10 and the inner liner 11 of the combustion tube 9. Fuel pipe units 18 mounted to the outer casing 7 are coupled to a base portion 19 of the combustion tube 9. The fuel pipe units 18 constitute first fuel supply systems F1 for supplying fuel for diffusion combustion to the pilot burners 3 and second fuel supply systems F2 for supplying fuel for lean pre-mixed combustion to the main burners 4. Each of the fuel injection units 2 is mounted to the outer liner 10 via a flange 5A provided at its outer periphery and a support 5B provided at the outer liner 10. The outer liner 10 is mounted to the outer casing 7 by a liner fastening pin P. A first-stage nozzle NT of the turbine is coupled to a downstream end portion of the combustion tube 9.

Each of the pilot burners 3 is provided at a center portion of the corresponding fuel injection unit 2. The pilot burner 3 includes a fuel nozzle 31, a diffusion nozzle 32, and inside and outside swirlers 33. Fuel F for diffusion combustion from the first fuel supply system F1 is injected from the fuel nozzle 31. The fuel F injected from the fuel nozzle 31 is atomized by the compressed air CA which has passed through the swirlers 33, and then is sprayed into the combustion chamber 12 through the diffusion nozzle 32, thereby forming a diffusion combustion zone 50.

The main burner 4 of an annular shape is provided to enclose the outer periphery of the pilot burner 3. The main burner 4 includes fuel nozzles 41 arranged at circumferentially equal intervals, a pre-mixed passage 42, and inside and outside swirlers 43. Fuel F for pre-mixed combustion supplied from the second fuel supply system F2 is injected from the fuel nozzles 41 into the pre-mixed passage 42. The fuel F for pre-mixed combustion injected into the pre-mixed passage 42 is mixed with the compressed air CA which has passed through the swirlers 43, and results in a pre-mixed air-fuel mixture. The pre-mixed air-fuel mixture is injected into the combustion chamber 12, thereby forming a pre-mixed combustion zone 51.

The pilot burner 3 is supplied with the fuel F from the first fuel supply system F1 in all load zones. By comparison, the main burner 4 is supplied with the fuel F from the second fuel supply system F2 in a high load zone (high fuel pressure zone) and a medium load zone (medium fuel pressure zone). The high load zone is a load zone which is not less than, for example, 70% of a maximum load. The medium-load zone is between the high load zone and the low load zone (low fuel pressure zone), and is a load zone which is, for example, 40~70% of the maximum load. The main burner 4 is not supplied with the fuel F in the low load zone which is a load zone which is not more than, for example, 40% of the maximum load. Therefore, in this load zone, only the compressed air CA is supplied to the main burner 4 and to the combustion chamber 12.

<Configuration of Fuel Control System>

Figure 3:
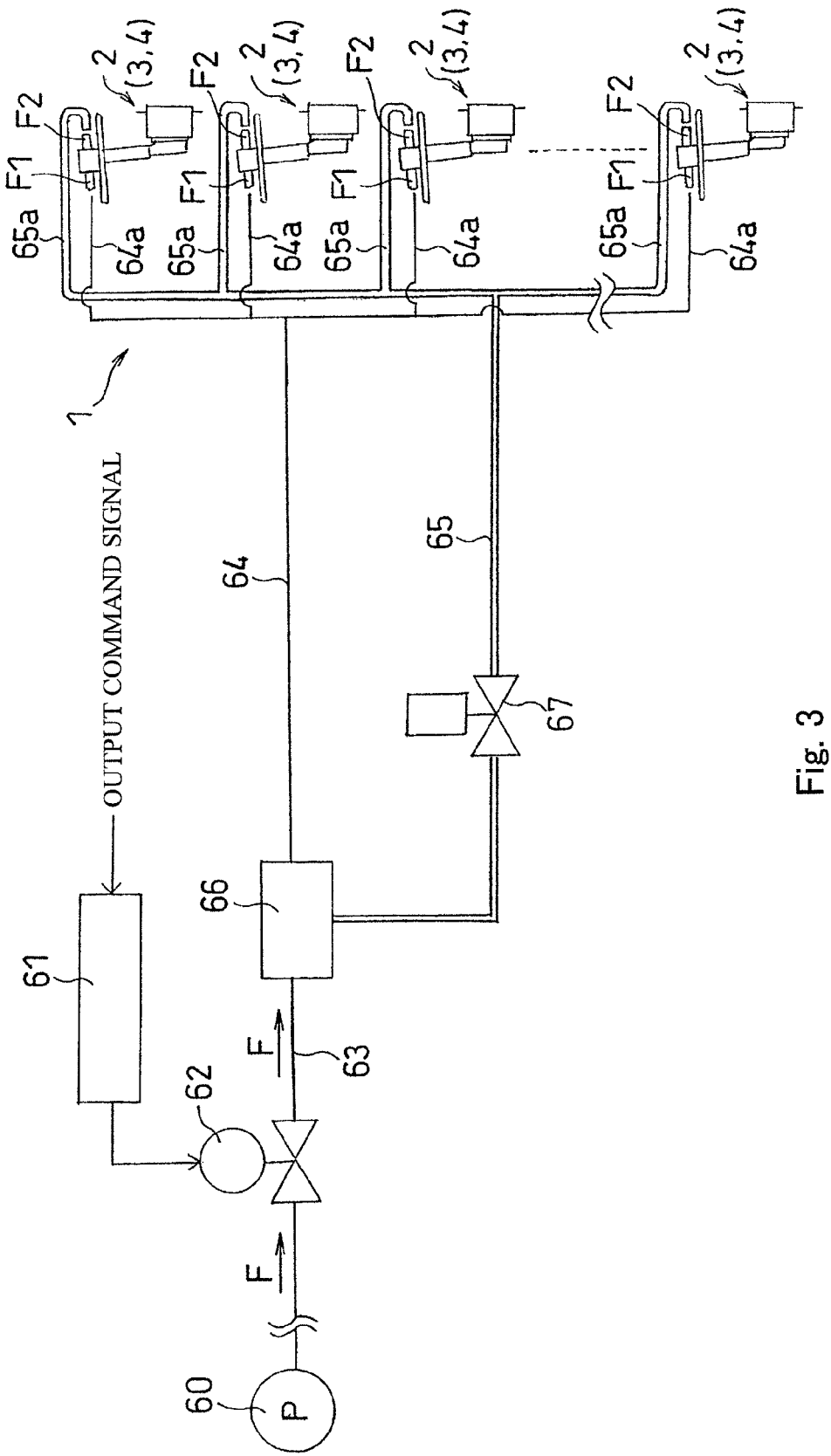
FIG. 3 is a view showing a fuel control system.

Next, the fuel control system of the gas turbine engine will be described with reference to FIG. 3. As shown in FIG. 3, a common pilot fuel passage 64 and a common main fuel passage 65 are connected to the fuel injection units 2 of the combustor 1. The upstream end of the pilot fuel passage 64 and the upstream end of the main fuel passage 65 are connected to a collecting fuel passage 63. The collecting fuel passage 63 is provided with a fuel pump 60 and a total flow control valve 62. The total flow control valve 62 is controlled by a fuel controller 61. The fuel pump 60 is actuated to feed the fuel F to the interior of the collecting fuel passage 63. The fuel controller 61 receives an output command signal by, for example, an operation of a throttle lever provided outside. In accordance with the command signal, the fuel controller 61 sets an opening degree of the total flow control valve 62. By setting the opening degree of the total flow control valve 62 properly, the fuel is supplied to the entire combustor 1 with a required amount via the collecting fuel passage 63, the pilot fuel passage 64, and the main fuel passage 65.

A fuel divider 66 is provided at a branch portion at which the collecting fuel passage 63 branches into the pilot fuel passage 64 and the main fuel passage 65. The pilot fuel passage 64 branches into plural passages (14 passages). The branch passages 64a communicate with the pilot burners 3 via the first fuel supply systems F1 of the corresponding fuel injection units 2, respectively. Likewise, the main fuel passage 65 branches into plural passages (14 passages). The branch passages 65a communicate with the main burners 4 via the second fuel supply systems F2 of the corresponding fuel injection units 2, respectively. The main fuel passage 65 is provided with a cut-off valve 67 which closes the main fuel passage 65 under an engine load state which is not more than a certain load, i.e., in the low load zone including starting of the gas turbine engine. In this configuration, in the low load zone, the main fuel passage 65 is closed more surely, and only the diffusion combustion is conducted by the pilot burners 3. As a result, stability of combustion including ignition performance and flame stabilizing performance can be ensured.

<Configuration of Fuel Divider>

Figure 4:
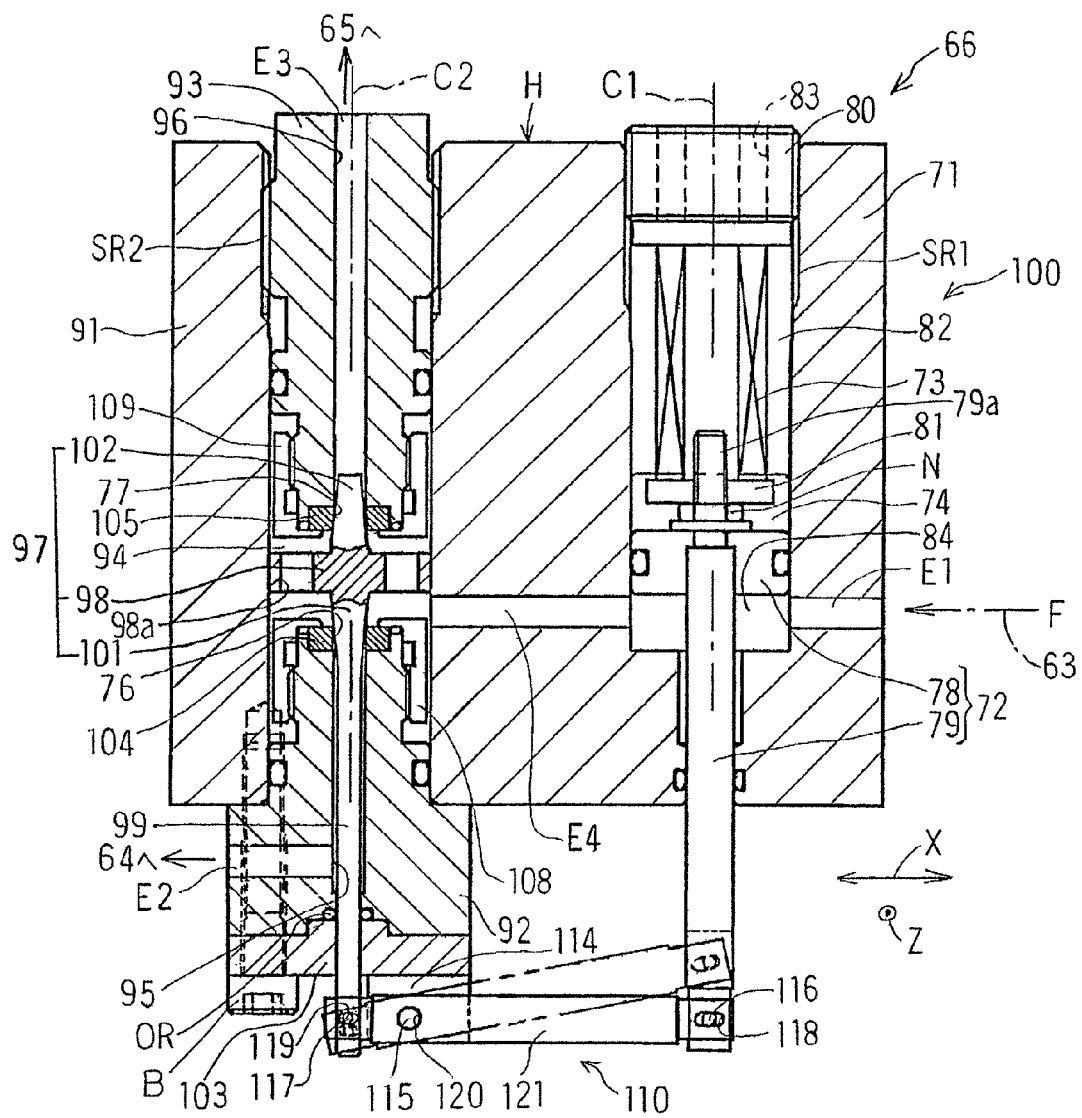
FIG. 4 is a longitudinal-sectional view showing a fuel divider.

Next, the configuration of the fuel divider 66 will be described with reference to FIGS. 4 to 6. FIG. 4 is a longitudinal sectional view of the fuel divider 66. As shown in FIG. 4, the fuel divider 66 of the present embodiment is of a cylinder type, and includes a drive cylinder 71, a movable member 72, a valve element cylinder 91, a first valve block 92, a second valve block 93, and a coupling mechanism 110. Hereinafter, these components will be described sequentially.

The drive cylinder 71 is configured to house the movable member 72 as described later. A top portion of a hollow portion 74 of the drive cylinder 71 is provided with a female thread. A spring adjusting member 80 which also serves as a lid member is threaded into the female thread. A spring chamber 82 is formed between the spring adjusting member 80 and the movable member 72. A coil-shaped compressive spring member 73 is inserted into the spring chamber 82. The spring member 73 applies a force to the movable member 72 in a downward direction in FIG. 4. An initial strain amount, i.e., a spring force of the spring member 73 is adjusted by changing an amount up to which the spring adjusting member 80 is threaded into the drive cylinder 71. The spring adjusting member 80 is provided with a plurality of communication holes 83 extending in a direction of a center axis C1 of the drive cylinder 71. Through the communication holes 83, the spring chamber 82 communicates with outside. A fuel entrance (inlet) E1 is provided on the side portion of the drive cylinder 71 to extend in a radial direction X. The fuel entrance E1 communicates with the downstream end portion of the collecting fuel passage 63 (see FIG. 3), and opens in a drive chamber 84 formed under the bottom surface of the piston 78.

The movable member 72 is movable in the direction of the center axis C1 inside the drive cylinder 71. The movable member 72 includes the piston 78 slidably inserted into the hollow portion 74, and a connecting rod 79 coupled to the piston 78 and extending axially downward. The connecting rod 79 is inserted into the piston 78, and its tip end portion (upper end portion) protrudes into the spring chamber 82. The connecting rod 79 has a male thread at a tip end portion thereof. A flanged nut N and a spring receiver seat 81 are threaded into the tip end portion in this order.

The valve element cylinder 91 is configured to house a valve element 97 therein. The valve element cylinder 91 and the drive cylinder 71 are formed unitarily to construct a housing unit H. A first valve block 92 and a second valve block 93 as described later are attached to the inner surface of the valve element cylinder 91 such that the first valve block 92 and the second valve block 93 are axially spaced apart from each other. A valve chamber 94 is formed between the first valve block 92 and the second valve block 93. The first valve block 92 is provided with a communication passage E4 extending in the radial direction X. Through the communication passage E4, the valve chamber 94 and the drive chamber 84 of the drive cylinder 71 communicate with each other. Since the fuel entrance E1 communicates with the drive chamber 84 of the drive cylinder 71 as described above, the fuel entrance E1, the drive chamber 84, and the valve chamber 94 communicate with one another through the communication passage E4.

The first valve block 92 is located at the other end side (lower side in FIG. 4) of the valve element cylinder 91. The first valve block 92 has a linear through-hole 95 axially extending. A bottom plate 103 is fastened to the bottom portion of the first valve block 92 by a bolt B reaching the valve element cylinder 91. A seal ring OR is mounted between the first valve block 92 and the bottom plate 103, in the vicinity of the through-hole 95. The seal ring OR prevents the fuel F from leaking through the through-hole 95. A valve seat 104 on which a pilot port needle valve element 101 is seated is attached to the end portion of the first valve block 92 at the valve chamber 94 side. The interior of the valve seat 104 defines the pilot port 76. The valve seat 104 is fastened to the first valve block 92 by a hexagon cap nut 108. The valve seat 104 is constituted by a seal washer made of a material having higher elasticity than the valve element 101 made of steel, for example, resin or rubber. The first valve block 92 is provided with a pilot exit (outlet) E2 penetrating a peripheral wall thereof in the radial direction X. The through-hole 95 of the first valve block 92 communicates with the pilot fuel passage 64 (see FIG. 3) via the pilot exit E2.

The second valve block 93 is located at one end side (upper side in FIG. 4) of the valve element cylinder 91. The second valve block 93 has a linear through-hole 96 extending axially. The valve element cylinder 91 has a female thread at one end portion of an inner peripheral surface thereof. The second valve block 93 is threaded into the female thread. The through-hole 96 of the second valve block 93 constitutes a main exit E3, and communicates with the main fuel passage 65 (see FIG. 3). A valve seat 105 is attached to the end portion of the second valve block 93 at the valve chamber 94 side. The center portion of the valve seat 105 defines the main port 77. The valve seat 105 is fastened to the second valve block 93 by a hexagon cap nut 108. The valve seat 105 is constituted by a seal washer made of a material having higher elasticity than the valve element 102 made of steel, for example, resin or rubber. In this structure, the valve seat 105 is pressed by the main port needle valve element 102 and is elastically deformed, thereby causing the main port 77 to be closed. With a simple structure, high sealing performance can be ensured, and the fuel can be sealed surely.

The valve element 97 is a member movable in a direction of a center axis C2 inside the valve element cylinder 91. In the present embodiment, the valve element 97 is made of steel, and is a dual needle valve having a longitudinal section of a substantially cross-shape. The valve element 97 includes a body 98, the pilot port needle valve element 101 and the main port needle valve element 102. Among these, the body 98 has a disc-shape, and is placed in the interior of the valve chamber 94. The body 98 has a plurality of communication holes 98a axially penetrating therethrough such that the communication holes 98a are arranged at circumferentially equal intervals. The pilot port needle valve element 101 is positioned at one side in the axial direction of the body 98, and extends axially to have a taper shape in which a thickness decreases gradually from a base end at the body 98 side toward a tip end (in a downward direction in FIG. 4). The main port needle valve element 102 is positioned at one side in the axial direction of the body 98, and extends axially to have a taper shape in which a thickness decreases gradually from a base end at the body 98 side toward a tip end (in an upward direction in FIG. 4). The pilot port needle valve element 101 is provided integrally with a valve actuating rod 99 at a tip end portion thereof. In the present embodiment, the pilot port needle valve element 101 is configured to adjust the opening degree of the pilot port 76, and need not fully close the pilot port 76. Therefore, the valve seat 104 need not be made of a material having high elasticity.

The coupling mechanism 110 couples the valve actuating rod 99 of the valve element 97 to the connecting rod 79 of the movable member 72. The coupling mechanism 110 is mainly composed of a mount plate 114 mounted to the bottom surface of the bottom plate 103, and a coupling member 121 which is an elongated rod shape. The mount plate 114 is provided with a cylindrical pivot 115 protruding in a direction Z perpendicular to the drawing sheet. The coupling member 121 has oval engagement holes 118 and 119 at both ends. In addition, the coupling member 121 has a circular fitting hole 120 in a portion between the engagement holes 118 and 119 in a location closer to the engagement hole 119. An engagement pin 116 provided at the lower portion of the connecting rod 79 to protrude in Z-direction is inserted into the engagement hole 118 of the coupling member 121. An engagement pin 117 provided at the lower portion of the valve actuating rod 99 to protrude in Z-direction is inserted into the engagement hole 119 of the coupling member 121. The pivot 115 is pivotally inserted into the fitting hole 120 of the coupling member 121. This allows the coupling member 121 to be pivoted around the pivot 115 according to the axial movement of the connecting rod 79 and the valve actuating rod 99. The coupling mechanism 110, the drive cylinder 71, and the movable member 72 (piston 78 and connecting rod 79) constitute a drive element 100.

<Operation of Fuel Divider>

Next, the operation of the fuel divider 66 will be described with reference to FIGS. 5 and 6. FIG. 5 is enlarged view of a portion of FIG. 4, showing an open state of the pilot port 76. FIG. 6 is an enlarged view of a portion of FIG. 4, showing an open state of the main port 77.

Figure 5:
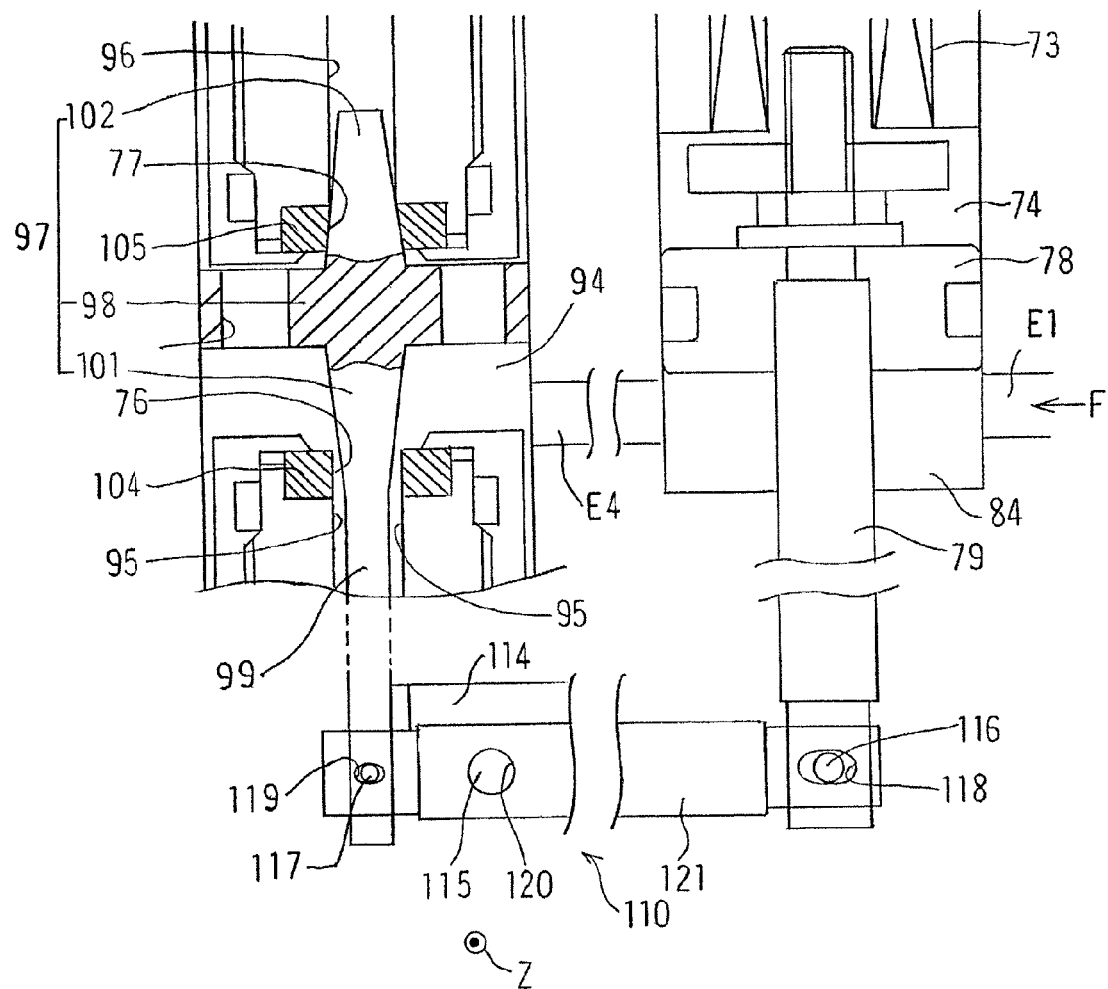
FIG. 5 is a partially enlarged view showing major components of the fuel divider of FIG. 4.

In a state where the fuel pressure at the fuel entrance E1 is low, as shown in FIG. 5, the piston 78 inside the drive cylinder 71 is pressed down by the spring force applied by the spring member 73, causing the connecting rod 79 to move downward. Thereby, the coupling member 121 is pivoted around the pivot 115 and presses up the valve element 97 via the valve actuating rod 99. As a result, the pilot port needle valve element 101 moves away from the valve seat 104 and opens the pilot port 76, while the main port needle valve element 102 is seated on the valve seat 105 and closes the main port 77. Since the main port needle valve element 102 is moved to close the main port 77, high sealing performance can be ensured, and the fuel can be sealed surely.

Figure 6:
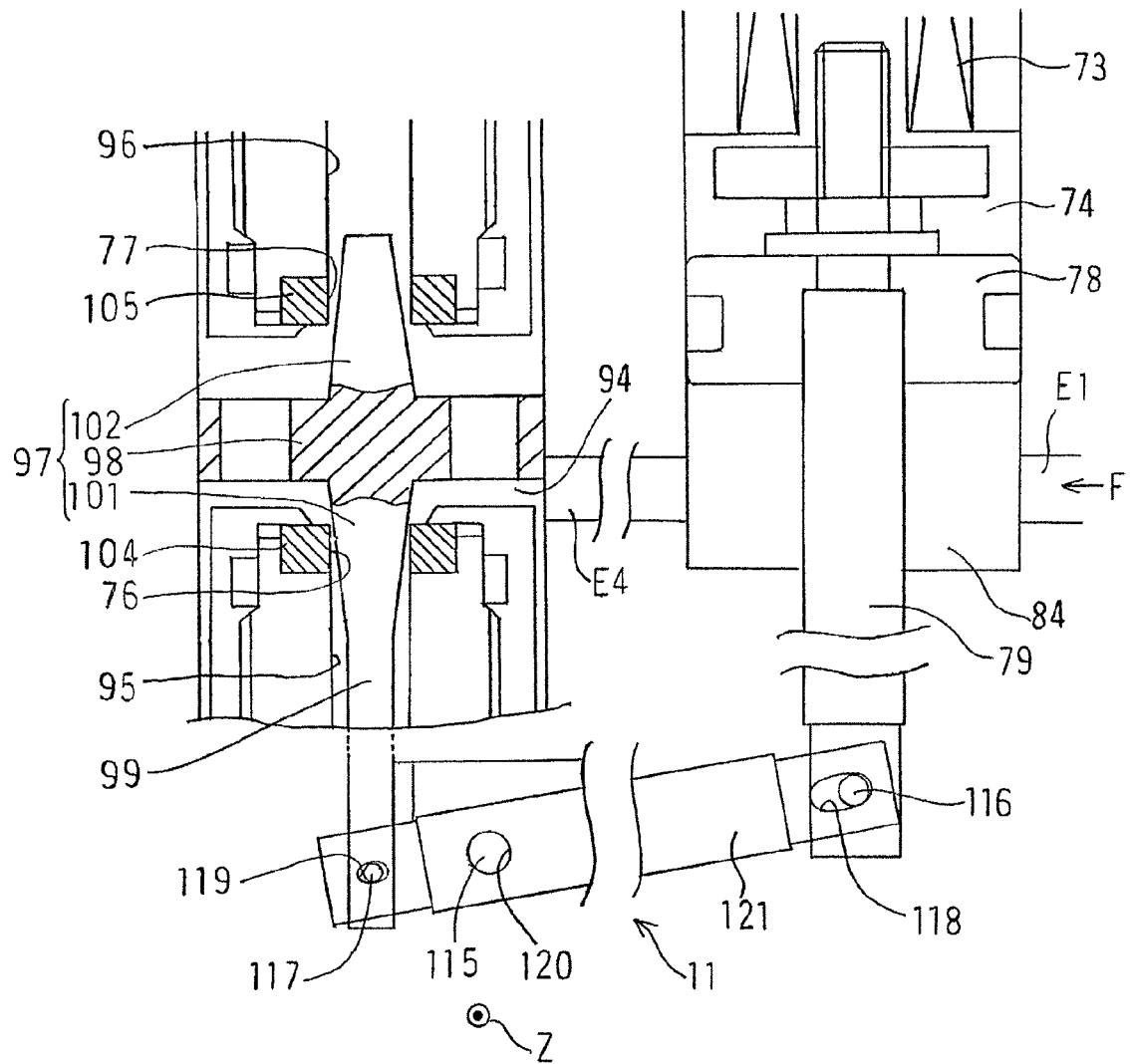
FIG. 6 is a partially enlarged view showing major components of the fuel divider of FIG. 4.

When the fuel pressure at the fuel entrance E1 increases, as shown in FIG. 6, the piston 78 inside the drive cylinder 71 is pressed up, causing the connecting rod 79 to move upward. Thereby, the coupling member 121 is pivoted in a direction opposite to that described above, the valve actuating rod 99 moves downward, and the valve element 97 moves down. Thereby, the main port needle valve element 102 moves axially downward from a location shown in FIG. 5 in a direction away from the valve seat 105, thereby opening the main port 77. At this time, further, the pilot port needle valve element 101 moves axially downward closer to the valve seat 104, thereby decreasing the opening degree of the pilot port 76.

As described above, in accordance with the present embodiment, with a simple configuration, the pilot port 76 and the main port 77 gradually and smoothly transition to the open state or to the closed state, according to the fuel pressure. Because of this, the amount of the fuel fed to the pilot fuel passage 64 and the amount of the fuel fed to the main fuel passage 65 in each fuel pressure zone can be adjusted smoothly. By adjusting the position of the pivot 115, the amount of movement of the valve element 97 (pilot port needle valve element 101 and main port needle valve element 102) actuated according to the fuel pressure can be adjusted. Specifically, if the position of the pivot 115 is changed to the right in FIG. 4, the amount of movement of the valve element 97 with respect to the fuel pressure increases, while if the position of the pivot 115 is changed to the left in FIG. 4, the amount of movement of the valve element 97 decreases. This makes it possible to suitably adjust the amount of the fuel fed to the pilot fuel passage 64 and the amount of the fuel fed to the main fuel passage 65 can be adjusted suitably according to, for example, a flight pattern of aircraft.

<Relationship Between Fuel Pressure and Flow Rate>

Figure 7:
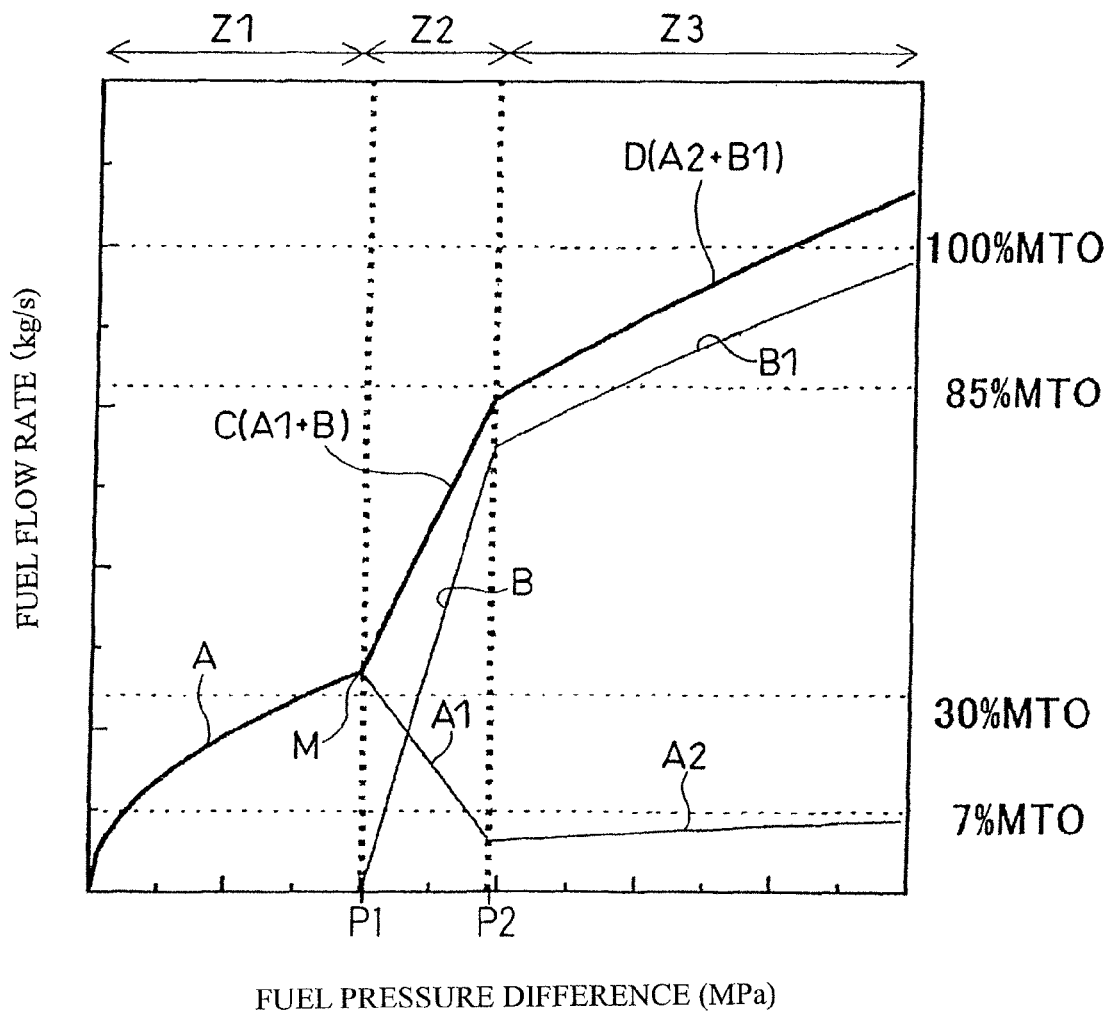
FIG. 7 is a curve showing a flow (flow rate) change according to a fuel pressure change in the fuel divider.

Subsequently, the relation between the fuel pressure and the flow rates of the respective fuel passages in a case where the fuel divider 66 of the present embodiment is used will be described with reference to FIG. 7. In FIG. 7, a horizontal axis indicates a pressure difference (hereinafter referred to as "fuel pressure difference") between the pressure at the fuel entrance E1 and the pressure in the combustion chamber 12 (equal to the pressure at the exit EX of the pilot burner 3), and a vertical axis indicates the flow rate of the fuel F. The fuel pressure difference corresponds to an engine load. In FIG. 4, a curve line indicated by a bold line indicates a flow rate (hereinafter referred to as "total flow rate") which is a sum of the flow rate of the fuel flowing through the pilot fuel passage 64 and the flow rate of the fuel flowing through the main fuel passage 65. In a low fuel pressure zone Z1 in a state where only the pilot ports 76 are open, the total flow rate is the flow rate of the fuel flowing through the pilot fuel passage 64.

In the low fuel pressure zone Z1, in the fuel injection units 2 shown in FIG. 3, only the pilot burners 3 perform diffusion combustion using the fuel F supplied from the pilot ports 76 through the pilot fuel passage 64. Therefore, combustion is carried out stably with high ignition performance and high flame stabilizing performance. The low pressure zone Z1 includes a predetermined 30% MTO (Max Take Off).

As the fuel pressure difference increases gradually, the piston 78 inside the drive cylinder 71 of FIG. 4 starts to move up against the spring force applied by the spring member 73 from a location before the fuel pressure difference reaches P1 in FIG. 7. The coupling mechanism 110 causes the valve actuating rod 99 to move downward, and the valve element 97 starts to move down. When the fuel pressure difference reaches P1, the pilot port 76 starts to be closed, and the main port 77 starts to be opened as shown in FIG. 6, so that the fuel pressure difference falls into a medium fuel pressure zone Z2 in FIG. 7. In the medium fuel pressure zone Z2, the pilot port 76 starts to be closed gradually, and the flow rate of the fuel in the pilot fuel passage 64 decreases as the fuel pressure difference increases as indicated by a curve A1. At a time point of the fuel pressure difference P2 which is the end of the medium fuel pressure zone Z2, the pilot port 76 is a little open.

In the medium fuel pressure zone Z2, the main port 77 of FIG. 4 is opened gradually. Thereby, the flow rate of the fuel flowing through the main fuel passage 65 increases gradually as indicated by a curve B of FIG. 7. At the time point of the fuel pressure difference P2, the main port 77 is opened to its maximum opening degree. In this way, a most part of the fuel F is supplied to the main fuel passage 65, and the remaining part of the fuel F is supplied to the pilot fuel passage 64. As a result, the fuel injection units 2 are supplied with the fuel F from both of the pilot fuel passage 64 and the main fuel passage 65, and the pilot burner 3 and the main burner 4 are both activated. A total flow rate indicated by a curve C in the medium fuel pressure zone Z2 in FIG. 7 is set by the total flow control valve 62. The fuel is supplied to the pilot fuel passage 64 of FIG. 4 in such a manner that the pilot port 76 is closed gradually. This makes it possible to smoothly reduce the flow rate of the fuel flowing through the pilot fuel passage 64.

When the fuel pressure difference reaches a high fuel pressure zone Z3 of FIG. 7, corresponding to a high load, the piston 78 inside the drive cylinder 71 of FIG. 4 is pressed up due to the fuel pressure. The coupling mechanism 110 causes the valve actuating rod 99 to move downward, the valve element 97 moves down, and the main port needle valve element 102 is opened. As a result, the fuel F1 is introduced through the fuel entrance E1 and supplied to the main fuel passage 65 through the drive chamber 84 of the drive cylinder 71, the communication passage E4, the valve chamber 94, and the main port 77, and then the main exit E3. In this state, as the fuel pressure difference increases, the flow rate of the fuel flowing through the main fuel passage 65 and the flow rate of the fuel flowing through the pilot fuel passage 64 increase as indicated by a curve A2 and a curve B1. At this time, the fuel F is supplied so that the ratio between the flow rate of the fuel supplied from the pilot port 76 to the pilot fuel passage 64 and the flow rate of the fuel supplied from the main port 77 to the main fuel passage 65 is a predetermined ratio 1:9.

In the above described manner, in the high fuel pressure zone Z3 of FIG. 7, the flow rate of the fuel flowing through the pilot fuel passage 64 increases with the fuel pressure difference such that this flow rate is suppressed to about 10% of the total flow rate, while the flow rate of the fuel flowing through the main fuel passage 65 increases such that this flow rate is maintained at about 90% of the total flow rate as indicated by the curve B1. Note that the high fuel pressure zone Z3 includes a predetermined 85% MTO. In this way, in the high fuel pressure zone Z3, the main burner 4 primarily performs the pre-mixed combustion while achieving reduced $NO_x$ and the pilot burner 3 secondarily performs diffusion combustion, thereby ensuring combustion stability.

As stated above, in the present invention, by using the fuel divider 66 provided at the branch portion at which the collecting fuel passage 63 branches into the pilot fuel passage 64 and the main fuel passage 65, as shown in FIG. 3, the amount of the fuel fed to the pilot fuel passage 64 and the amount of the fuel fed to the main fuel passage 65 are adjusted automatically according to the fuel pressure, i.e., the engine load. Thus, the diffusion combustion and the pre-mixed combustion can be carried out appropriately in the combustor 1. Since it is not necessary to provide the flow control valve in each of the pilot fuel passage 64 and the main fuel passage 65, the structure is simplified, and a complicated control circuit may be dispensed with, which results in cost saving. Since the pilot port 76 and the main port 77 gradually transition to the open state or to the closed state, according to the fuel pressure, the amount of the fuel fed to the pilot fuel passage 64 and the amount of the fuel fed to the main fuel passage 65 can be adjusted smoothly according to each fuel pressure. Furthermore, since the main port 77 is closed by moving the main port needle valve element 102, the main port 77 has high sealing performance, and thus, the fuel can be sealed surely.

The pilot port needle valve element 101 and the main port needle valve element 102 constituting the valve element 97 are positioned on axial one end surface and an axial opposite end surface of the body 98 slidable inside the valve element cylinder 91, and are provided integrally with the body 98. Because of this, the structure of the valve element 97 can be simplified, and the size of the entire fuel divider 66 can be reduced.

Since the fuel entrance E1 is provided between the valve chamber 94 of the valve element cylinder 91 and the drive chamber 84 of the drive cylinder 71, a passage through which the fuel F is introduced into the drive chamber 84 and the valve chamber 94 is simplified. As a result, the size of the fuel divider 66 can be reduced.

Embodiment 2

Figure 8:
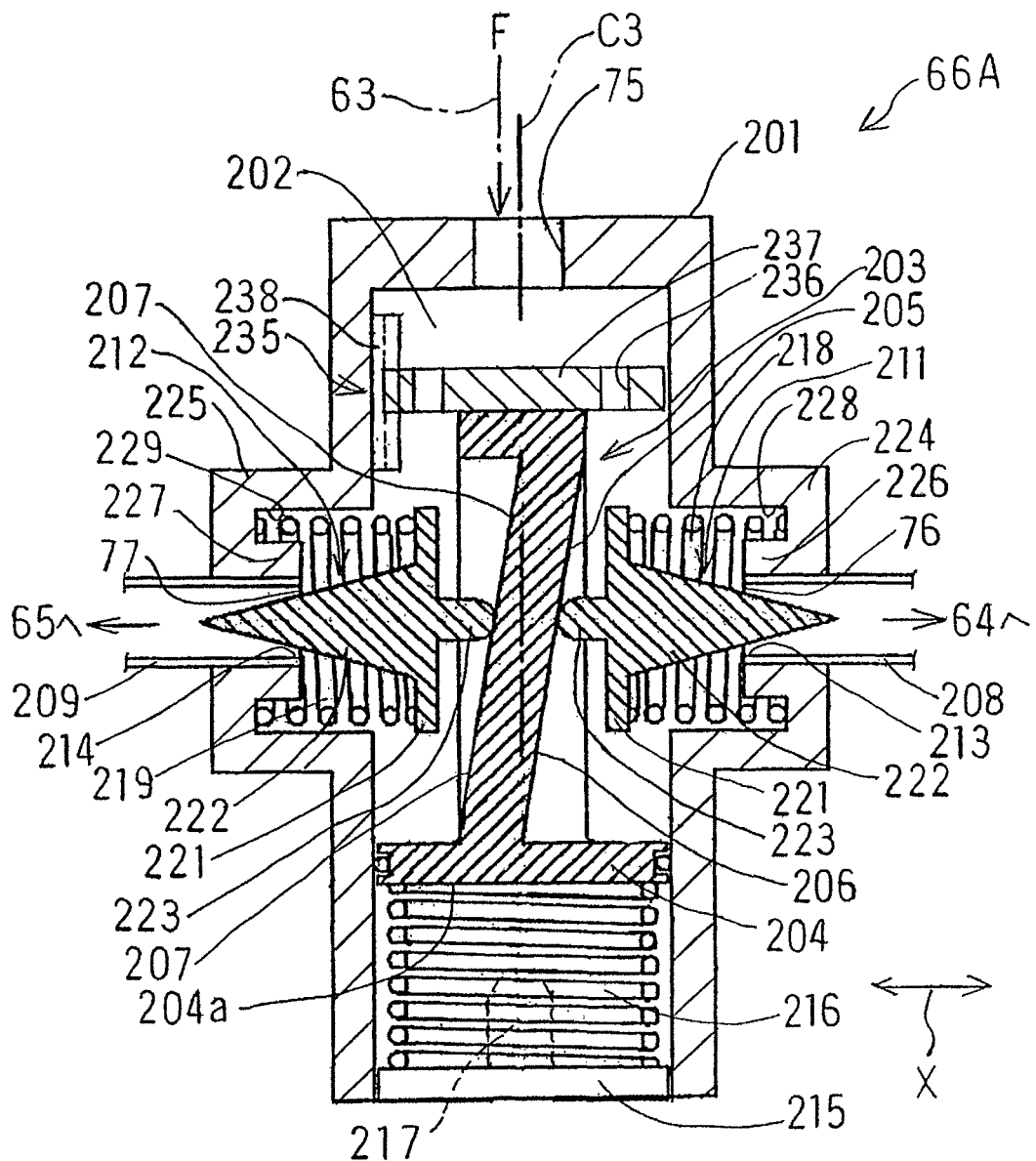
FIG. 8 is a longitudinal sectional view showing Embodiment 2 of the present invention.
Figure 9:
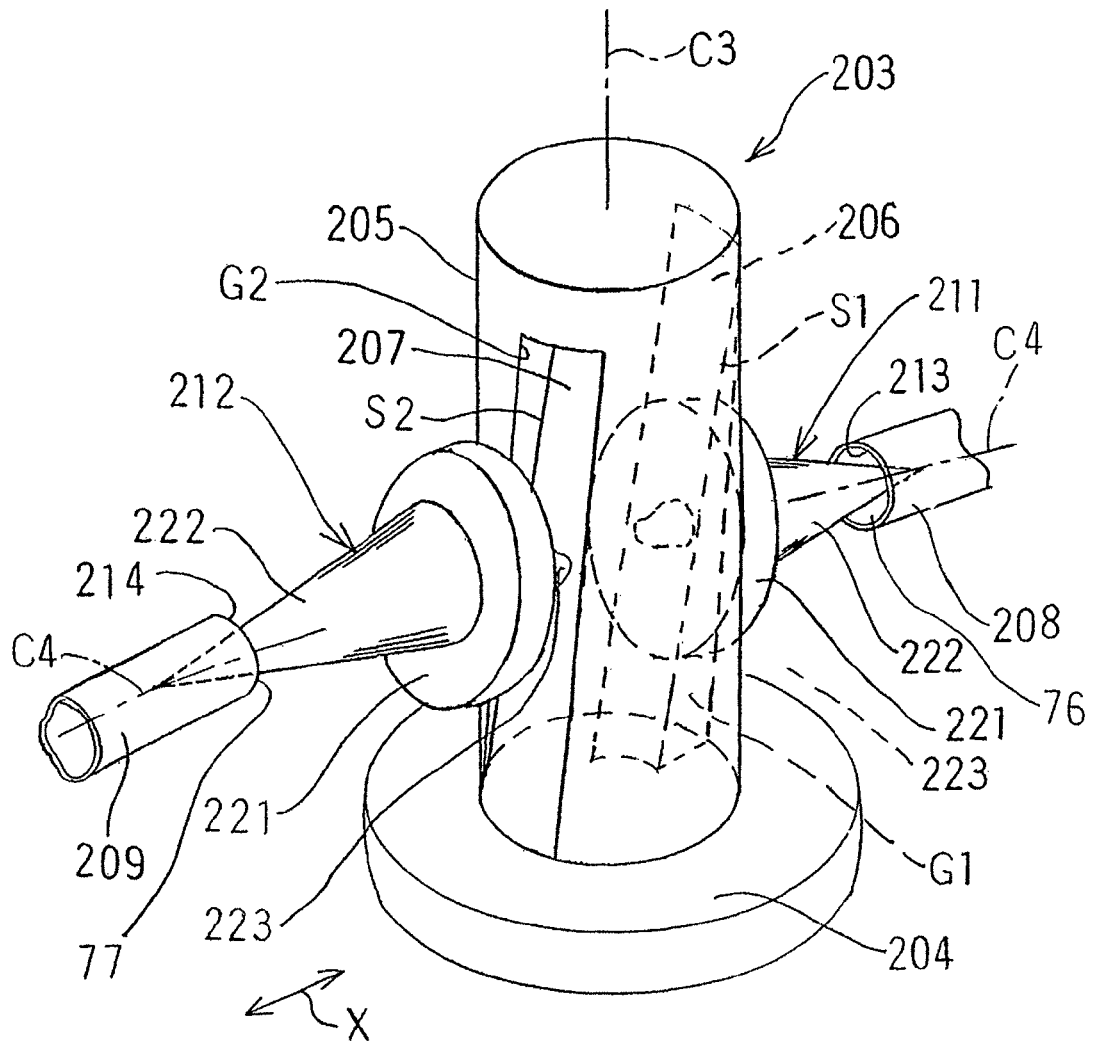
FIG. 9 is a perspective view showing major components of the fuel divider of FIG. 8.

Subsequently, a fuel supply device of Embodiment 2 of the present invention will be described with reference to FIGS. 8 to 10. The fuel supply device of the present embodiment is basically identical in configuration to the fuel supply device of Embodiment 1, except for the configuration of the fuel divider. Therefore, hereinafter, a fuel divider 66A of the present embodiment will be described in a larger part.

<Configuration of Fuel Divider>

First of all, the configuration of the fuel divider 66A will be described. FIG. 8 is a longitudinal sectional view showing the fuel divider 66A of Embodiment 2. As shown in FIG. 8, the fuel divider 66A of the present embodiment includes a housing unit 201, a drive element 203, a pilot port needle valve element 211, and a main port needle valve element 212. These components will be described sequentially.

The housing unit 201 is a member for housing the drive element 203 therein. As shown in FIG. 8, the housing unit 201 is provided on a top portion thereof with a fuel entrance (inlet) 75 communicating with the downstream portion of the collecting fuel passage 63, and on side portions thereof, the pilot port 76 and the main port 77. A disc-shaped spring adjustment member 215 is mounted to a bottom opening of the housing unit 201. A coil-shaped compressive adjustment spring member 216 is interposed between the spring adjusting member 215 and the drive element 203. The compressive adjustment spring member 216 applies a force to the drive element 203 in an upward direction in FIG. 8. An initial strain amount of the spring of the compressive adjustment spring member 216 is adjusted by changing the axial position of the spring adjusting member 215. A stopper 217 is attached to the upper surface of the spring adjusting member 215 to protrude axially upward. The stopper 217 restricts the down position of the drive element 203.

Protruding wall portions 224 and 225 are provided on the peripheral wall of the housing unit 201 to face each other with respect to a center axis C3 between them. The protruding wall portions 224 and 225 protrude outward in the radial direction X. Bosses 226 and 227 are provided to protrude inward in the radial direction X. Seal pipes 208 and 209 are secured to the inside of the protruding wall portion 224 and to the inside of the protruding wall portion 225, respectively. Valve seats 213 and 214 on which the needle valve elements 211 and 212 (described later) are to be seated are provided on inner end portions (inlet end portions) of the seal pipes 208 and 209, respectively. The seal pipes 208 and 209 are made of rubber or resin having higher elasticity than the metal-made needle valve elements 211 and 212. The downstream portion of the seal pipe 208 communicates with the pilot fuel passage 64, while the downstream portion of the seal pipe 209 communicates with the main fuel passage 65. The upstream end portion of the seal pipe 208 constitutes the pilot port 76, while the upstream end portion of the seal pipe 209 constitutes the main port 77.

A rotation inhibiting mechanism 235 is provided at the upper portion of the housing unit 201. The rotation inhibiting mechanism 235 includes a guide section 237 and a guide member 238. The guide section 237 is joined to the upper surface of a drive portion 205 (described later) by welding or is integrated with the drive portion 205. The guide section 237 is provided with a plurality of through-holes 236 extending in the direction of the center axis C3. The guide member 238 is attached to the inner peripheral surface of the housing unit 201, and is configured to guide the guide section 237 (i.e., drive element 203) such that the guide section 237 is inhibited from moving circumferentially with respect to the housing unit 201 and is slidable in the direction of the center axis C3. As described later, the rotation inhibiting mechanism 235 allows a pilot cam surface 206 and a cam follower 223 of the pilot port needle valve element 211 to face each other accurately, and a main cam surface 207 and a cam follower 223 of the main port needle valve element 212 to face each other accurately.

The drive element 203 is a member housed in the housing unit 201, and being movable in the direction (axial direction) of the center axis C3. As shown in FIGS. 8 and 9, the drive element 203 includes a large-diameter disc-shaped pressure receiving bottom plate 204 provided at a base end portion (lower end portion) to receive the fuel pressure, the small-diameter cylindrical drive portion 205 extending axially upward and continuously with the pressure receiving bottom plate 204, and a large-diameter disc-shaped guide portion 237 secured to or integrated with the top portion of the drive portion 205. The drive portion 205 has the pilot cam surface 206 on one side thereof, and the main cam surface 207 on the other side thereof which is opposite to the one side. As shown in FIG. 9, the drive portion 205 of the drive element 203 has the pilot cam surface 206 defined by a groove portion G1 extending axially on a right side surface thereof, and the main cam surface 207 defined by a groove portion G2 extending axially on a left side surface thereof. The pilot cam surface 206 has an inclined surface S1 gradually receding inward in the radial direction X from a base end toward a tip end (in an upward direction). On the other hand, the main cam surface 207 has an inclined surface S2 extending to an advanced position gradually inward in the radial direction X from the base end toward the tip end (in the upward direction).

The pilot port needle valve element 211 and the main port needle valve element 212 are members movable according to the axial movement of the drive element 20. To be specific, the drive element 203 moves axially according to the fuel pressure at the fuel entrance 75, thereby allowing the pilot port needle valve element 211 to be driven by the pilot cam surface 206 and the main port needle valve element 212 to be driven by the main cam surface 207. The needle valve elements 211 and 212 are positioned to face each other with respect to the center axis C3 between them. The needle valve elements 211 and 212 are unable to move in the direction of the center axis C3, and are able to move in the radial direction X. Each of the needle valve elements 211 and 212 includes a disc-shaped flange 221 in which the radial direction X is a valve element center axis C4, a valve element portion 222 located outward relative to the flange 221 in the direction of the center axis C4, and the cam follower 223 located inward relative to the flange 221 in the direction of the center axis C4.

Among the above constituents, the valve element portion 222 has a conical shape having an outer diameter decreasing in an outward direction of the direction of the center axis C4. The cam follower 223 extends in a direction opposite to the direction in which the valve element portion 222 extends and is movable on each of the cam surfaces 206 and 207. Furthermore, in the housing unit 201, there are provided an annular recess 228 between the protruding wall portion 224 and the boss 226 in the side portion of a cylinder bore 202, and an annular recess 229 between the protruding wall portion 225 and the boss 227 in the side portion of the cylinder bore 202. Between the annular recess 228 and the flange (spring receiver seat) 221 of the needle valve element 211, an opening spring member 218 constituted by a coil spring is inserted, while between the annular recess 229 and the flange (spring receiver seat) 221 of the needle valve element 212, an opening spring member 219 constituted by a coil spring is inserted. The valve element 211 is applied with a force from the opening spring member 218 to be away from the valve seat 213, while the valve element 212 is applied with a force from the opening spring member 219 to be away from the valve seat 214.

<Operation of Fuel Divider>

Figure 10A:
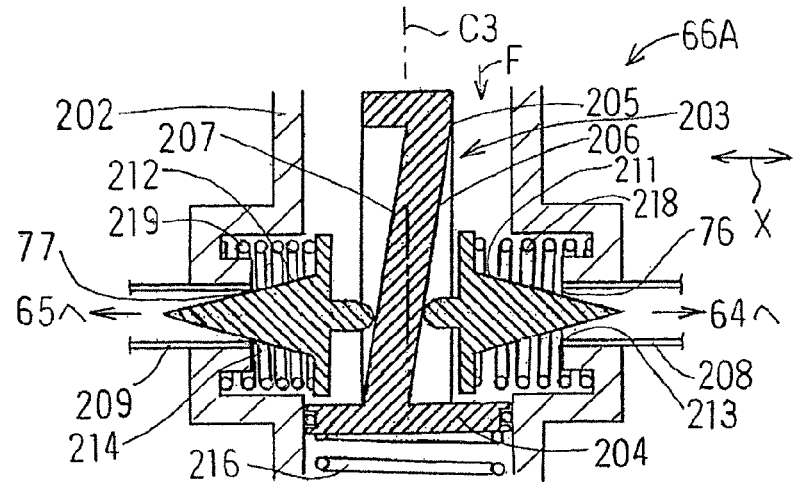
FIG. 10A is a longitudinal sectional view showing an open state of a pilot port of the fuel divider.

Subsequently, the operation of the fuel divider 66A of the present embodiment will be described with reference to FIG. 10. FIG. 10A shows a state where only the pilot port 76 is opened, FIG. 10B shows a state where the pilot port 76 and the main port 77 are a little opened, and FIG. 10C shows a state where the main port 77 is opened to a greater degree.

In a low fuel pressure zone (Z1 in FIG. 7) in which the fuel pressure at the fuel entrance 75 (see FIG. 8) is low, as shown in FIG. 10A, the spring force applied by the adjustment spring member 216 is greater than the pressure applied from the fuel F to the pressure receiving bottom plate 204, thereby causing the drive element 203 to move up. Thereby, the pilot port needle valve element 211 contacts the lower portion of the pilot cam surface 206, and therefore recedes inward in the radial direction X. As a result, the pilot port needle valve element 211 moves away from the valve seat 213, and opens the pilot port 76 gradually. The main port needle valve element 212 contacts the lower portion of the main cam surface 207, and moves to an advanced position in the outward direction of the radial direction X. Thereafter, the main port needle valve element 212 is pressed against the valve seat 214, and closes the main port 77. In this way, the main port 77 is pressed by the main port needle valve element 212 and is thereby closed. Therefore, the main port 77 provides high sealing performance when the main port 77 is closed.

Figure 10B:
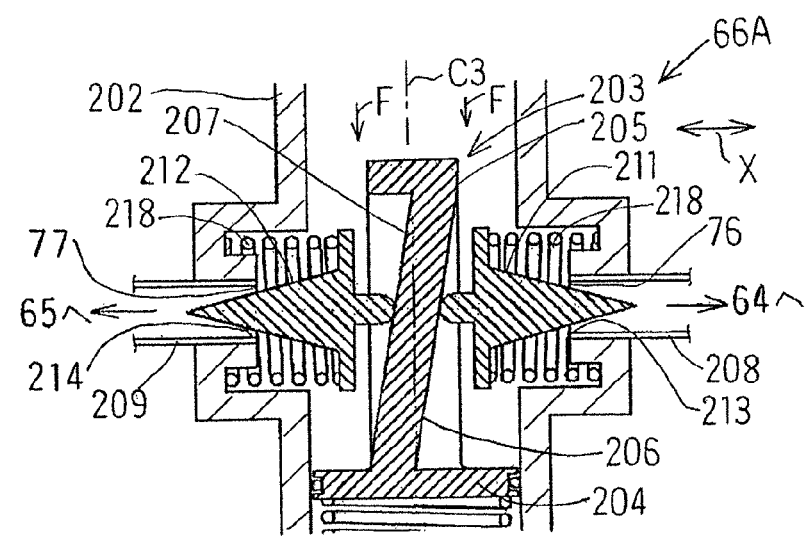
FIG. 10B is a longitudinal sectional view showing a transition state of the pilot port and a transition state of a main port.

When the fuel pressure increases and reaches a medium fuel pressure zone (Z2 in FIG. 7), as shown in FIG. 10B, the pressure receiving bottom plate 204 is pressed down due to the pressure of the fuel F, thereby causing the drive element 203 to move down. Thereby, the pilot port needle valve element 211 is pressed by the pilot cam surface 206 and moves gradually to an advanced position in the outward direction of the radial direction X. As a result, the pilot port needle valve element 211 moves closer to the valve seat 213 and decreases the opening degree of the pilot port 76. The main port needle valve element 212 recedes inward in the radial direction X gradually according to the main cam surface 207. As a result, the main port needle valve element 212 moves away from the valve seat 214, and opens the main port 77.

Figure 10C:
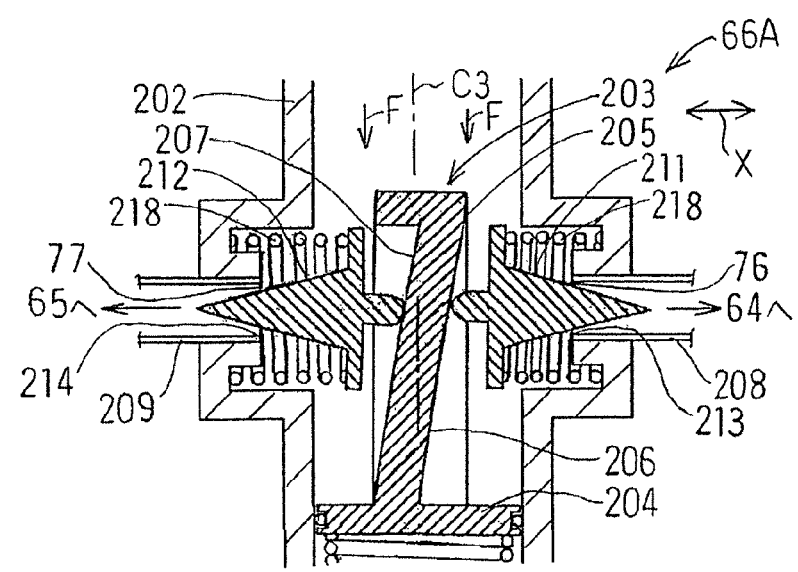
FIG. 10C is a longitudinal sectional view showing an open state of the main port.

In a high fuel pressure zone (Z3 in FIG. 7) in which the fuel pressure further increases, as shown in FIG. 10C, the drive element 203 further moves down, and the pilot port needle valve element 211 moves gradually to an advanced position in the outward direction of the radial direction X. The open state of the pilot port 76 is maintained in a state where its opening degree is smaller. The main port needle valve element 212 recedes gradually inward in the radial direction X. The main port needle valve element 212 moves to a greater degree away from the valve seat 214, and opens the main port 77 to a greater degree.

As should be appreciated from the foregoing description, the fuel divider 66A of the present embodiment is simply configured in such a manner that the drive element 203 moves inside the housing unit 201. Therefore, the fuel divider 66A can be implemented with a simple structure and inexpensively, and can seal the fuel surely.

Embodiment 3

Figure 11:
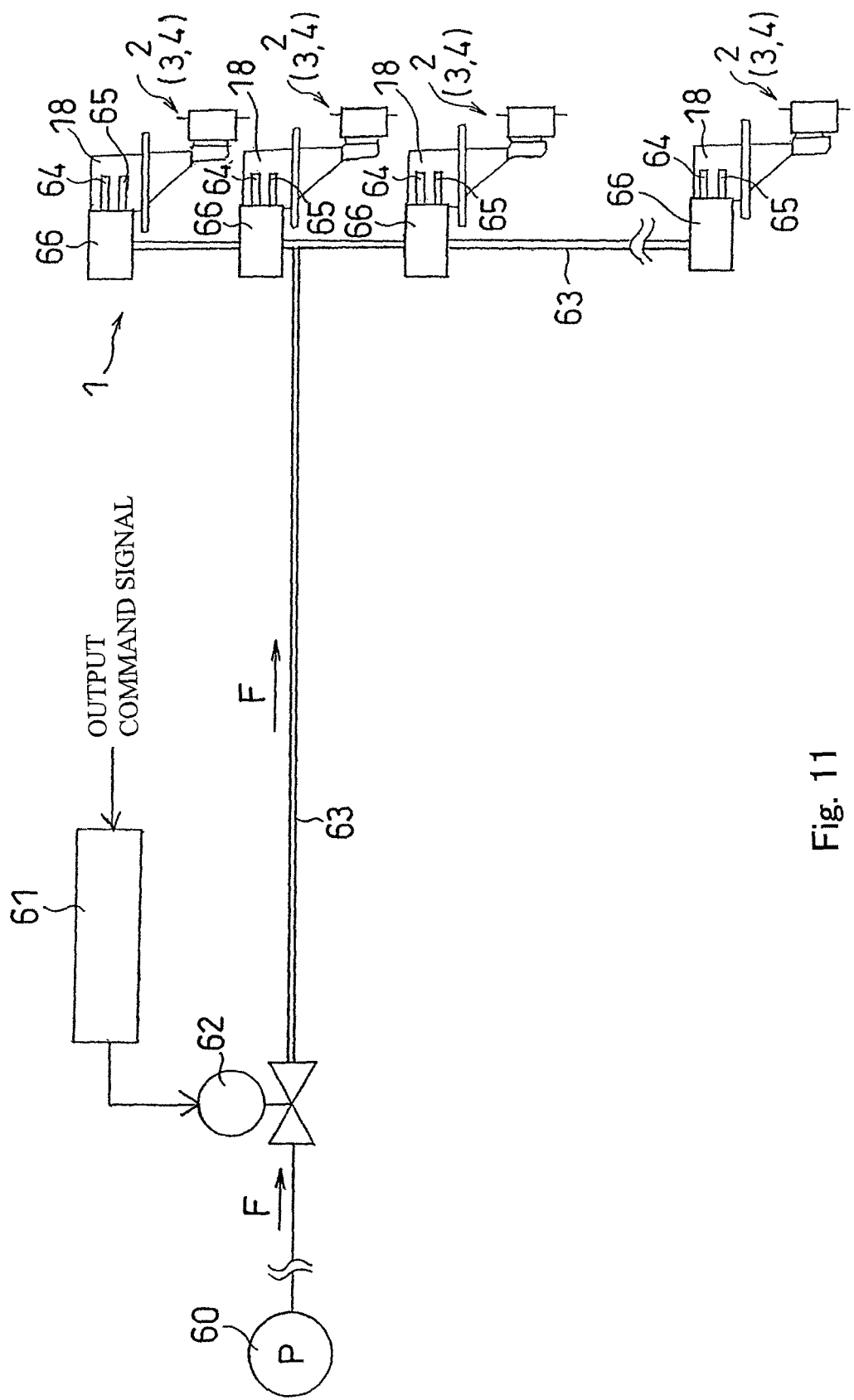
FIG. 11 is a view showing a fuel control system according to Embodiment 3 of the present invention.
Figure 12:
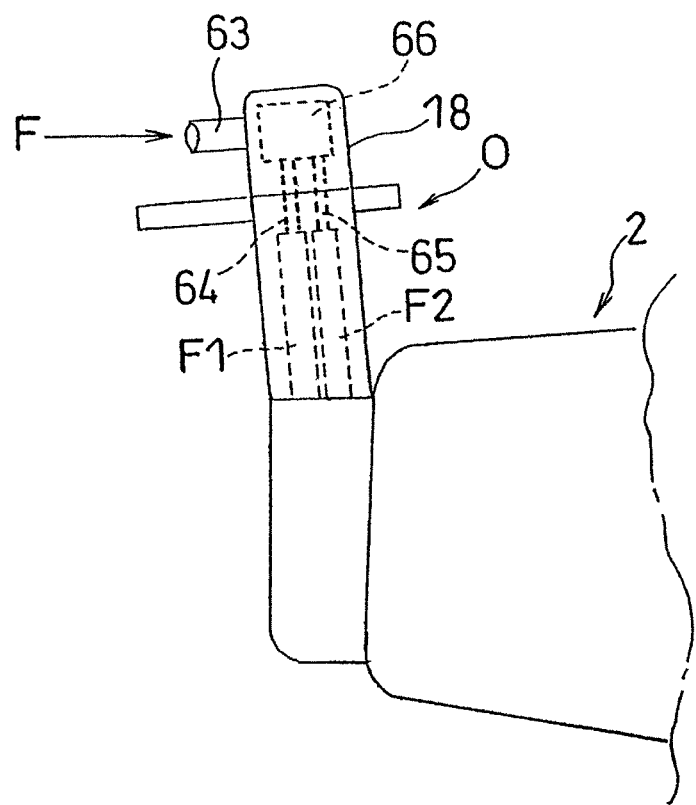
FIG. 12 is an enlarged side view of major components of a fuel injection unit of FIG. 11.

FIG. 11 is a view showing a fuel control system according to Embodiment 3 of the present invention. In the present embodiment, the collecting fuel passage 63 is extended up to the fuel injection units 2, and the fuel divider 66 is provided for each of the fuel injection units 2 in a one-to-one correspondence. This follows that the pilot fuel passage 64 and the main fuel passage 65 are provided independently for each of the fuel injection units 2. As shown in FIG. 12, the fuel divider 66 is built into, for example, the fuel pipe unit 18 of each of the fuel injection units 2. In this configuration, the single collecting fuel passage 63 with a great cross-section is sufficient to reach each of the fuel injection units 2. This makes it easier to perform a piping work for laying out the fuel passage to the fuel injection units 2 as compared to the configuration in which two fuel passages, i.e., the pilot fuel passage 64 and the main fuel passage 65 are used, like Embodiment 1. The other operation and advantage of Embodiment 3 are similar to those of Embodiment 1. Although the fuel divider 66 shown in FIG. 11 is the fuel divider 66 described in Embodiment 1, it may be replaced by the fuel divider 66A of Embodiment 2 shown in FIG. 8.

Although in the above embodiments, the fuel spraying type of the pilot burner is of an air blast type, the present invention is not limited to this, but the fuel spraying type may be of, for example, a pressure spraying type. Although the main burner is of the pre-mixed combustion type, it may be of, for example, a diffusion combustion type.

REFERENCE SIGNS LISTS 1 combustor
2 fuel injection unit
3 pilot burner
4 main burner
63 collecting fuel passage
64 pilot fuel passage
65 main fuel passage
66, 66A fuel divider
71 drive cylinder
72 movable member (piston)
76 pilot port
77 main port
78 piston
79 connecting rod
91 valve element cylinder
97 dual needle valve (valve element)
100 drive element
101 pilot port needle valve element
102 main port needle valve element
110 coupling mechanism
201 housing unit
203 drive element 206 pilot cam surface
207 main cam surface
E1, 75 fuel entrance
F fuel

The invention claimed is:

1. A fuel supply device of a gas turbine engine, which supplies fuel to a combustor including a pilot burner and a main burner; the fuel supply device comprising:
   a pilot fuel passage through which the fuel is supplied to the pilot burner;
   a main fuel passage through which the fuel is supplied to the main burner;
   a collecting fuel passage through which the fuel is supplied to the pilot fuel passage and to the main fuel passage; and
   a fuel divider which divides the fuel supplied from the collecting fuel passage to feed the fuel to the pilot fuel passage and to the main fuel passage;
   wherein the fuel divider includes:
      a fuel entrance into which the fuel supplied from the collecting fuel passage is introduced;
      a pilot port connected to the pilot fuel passage;
      a main port connected to the main fuel passage;
      a pilot port needle valve element which adjusts an opening degree of the pilot port;
      a main port needle valve element which opens and closes the main port; and
      a drive element which is actuated according to the fuel pressure at the fuel entrance to drive the pilot port needle valve element and the main port needle valve element;
   wherein when the fuel pressure at the fuel entrance is not higher than a predetermined value, the fuel is supplied only to the pilot fuel passage; and
   when the fuel pressure at the fuel entrance is higher than the predetermined value, the fuel is supplied to the pilot fuel passage and to the main fuel passage.

2. The fuel supply device of the gas turbine engine according to claim 1,
   wherein the fuel divider further includes a valve element cylinder, and a body axially movable inside the valve element cylinder;
   the pilot port is provided at one end side of the valve element cylinder in an axial direction thereof;
   the main port is provided at the other end side of the valve element cylinder in the axial direction thereof;
   wherein the pilot port needle valve element is provided at one end side of the body in an axial direction; and
   the main port needle valve element is provided at an opposite end side of the body in the axial direction; and
   the body, the pilot port needle valve element, and the main port needle valve element constitute a dual needle valve element.

3. The fuel supply device of the gas turbine engine according to claim 2,
   wherein the drive element includes:
   a drive cylinder into which the fuel is introduced through the fuel entrance;
   a piston which is slidable inside the drive cylinder;
   a connecting rod coupled to the piston; and
   a coupling mechanism for coupling the dual needle valve to the connecting rod.

4. The fuel supply device of the gas turbine engine according to claim 3,
   wherein an interior of the valve element cylinder and an interior of the drive cylinder communicate with each other; and
   the fuel is introduced from the fuel entrance into the interior of the valve element cylinder through the interior of the drive cylinder.

5. The fuel supply device of the gas turbine engine according to claim 1,
   wherein the valve seat on which the pilot port needle valve element is seated is made of an material having higher elasticity than a material forming the pilot port needle valve element; and
   the valve seat on which the main port needle valve element is seated is made of a material having higher elasticity than a material forming the main port needle valve element.

6. The fuel supply device of the gas turbine engine according to claim 1,
   wherein the fuel divider further includes a housing unit;
   the housing unit is provided with the fuel entrance, the pilot port, and the main port, and the drive element is housed in the housing unit such that the drive element is axially movable; and
   the drive element includes a pilot cam surface which actuates the pilot port needle valve element and a main cam surface which actuates the main port needle valve element.

7. The fuel supply device of the gas turbine engine according to claim 6,
   wherein the drive element includes a pressure receiving bottom plate which receives the fuel pressure at the fuel entrance, and a drive portion coupled to the pressure receiving bottom plate;
   the drive portion has the pilot cam surface at one side thereof; and
   the drive portion has the main cam surface at the other side thereof, which is at an opposite side of the one side.

8. The fuel supply device of the gas turbine engine according to claim 6,
   wherein the housing unit is provided on a top portion thereof with the fuel entrance;
   the housing unit is provided with on side portions thereof the pilot port and the main port; and
   an adjustment spring member is placed at a bottom portion of the housing unit to press the drive element against the fuel pressure.

9. The fuel supply device of the gas turbine engine according to claim 2,
   wherein the valve seat on which the pilot port needle valve element is seated is made of an material having higher elasticity than a material forming the pilot port needle valve element; and
   the valve seat on which the main port needle valve element is seated is made of a material having higher elasticity than a material forming the main port needle valve element.

10. The fuel supply device of the gas turbine engine according to claim 3,
    wherein the valve seat on which the pilot port needle valve element is seated is made of an material having higher elasticity than a material forming the pilot port needle valve element; and
    the valve seat on which the main port needle valve element is seated is made of a material having higher elasticity than a material forming the main port needle valve element.

11. The fuel supply device of the gas turbine engine according to claim 4, wherein the valve seat on which the pilot port needle valve element is seated is made of an material having higher elasticity than a material forming the pilot port needle valve element; and the valve seat on which the main port needle valve element is seated is made of a material having higher elasticity than a material forming the main port needle valve element.

12. The fuel supply device of the gas turbine engine according to claim 7, wherein the housing unit is provided on a top portion thereof with the fuel entrance;

the housing unit is provided with on side portions thereof the pilot port and the main port; and an adjustment spring member is placed at a bottom portion of the housing unit to press the drive element against the fuel pressure.

\* \* \* \* \*